(12) United States Patent
Yang et al.

(10) Patent No.: US 10,705,931 B2
(45) Date of Patent: Jul. 7, 2020

(54) METHODS, DEVICES AND COMPUTER READABLE MEDIUMS FOR MANAGING STORAGE SYSTEM

(71) Applicant: EMC IP Holding Company LLC, Hopkinton, MA (US)

(72) Inventors: Lifeng Yang, Beijing (CN); Xinlei Xu, Beijing (CN); Jian Gao, Beijing (CN); Jibing Dong, Beijing (CN); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 15/954,774

(22) Filed: Apr. 17, 2018

(65) Prior Publication Data
US 2018/0300211 A1 Oct. 18, 2018

(30) Foreign Application Priority Data
Apr. 17, 2017 (CN) .......................... 2017 1 0250538

(51) Int. Cl.
*G06F 11/20* (2006.01)
*G06F 3/06* (2006.01)
*G06F 11/10* (2006.01)

(52) U.S. Cl.
CPC .......... *G06F 11/2094* (2013.01); *G06F 3/061* (2013.01); *G06F 3/0619* (2013.01); *G06F 3/0653* (2013.01); *G06F 3/0659* (2013.01); *G06F 3/0689* (2013.01); *G06F 11/1076* (2013.01); *G06F 2201/82* (2013.01)

(58) Field of Classification Search
CPC .. G06F 11/004; G06F 11/076; G06F 11/0772; G06F 11/1456; G06F 11/3485; G06F 11/1088; G06F 11/1662
See application file for complete search history.

(56) References Cited

U.S. PATENT DOCUMENTS

| | | | |
|---|---|---|---|
| 6,862,690 B1 | 3/2005 | Bezera et al. | |
| 7,213,165 B2 * | 5/2007 | Umberger | G06F 11/1092 714/42 |
| 7,475,124 B2 | 1/2009 | Jiang et al. | |
| 7,647,526 B1 * | 1/2010 | Taylor | G06F 11/1092 714/6.32 |
| 7,971,021 B2 | 6/2011 | Daud et al. | |
| 7,984,324 B2 | 7/2011 | Daud et al. | |

(Continued)

*Primary Examiner* — Nadeem Iqbal
(74) *Attorney, Agent, or Firm* — BainwoodHuang

(57) ABSTRACT

Embodiments of the present disclosure relate to methods, devices and computer readable mediums for managing a storage system. The storage system includes a disk array which includes at least one disk array group. The method comprises in response to receiving a first message indicating that a failure occurs in a disk in the disk array, determining first information on a disk array group that the failed disk belongs to. The method further comprises obtaining a first number of outstanding input/output (I/O) operations on rebuilding the failed disk in the disk array group. The method further comprises determining, based on the first information and the first number, a threshold number of I/O operations that is applicable for the disk array group. In addition, the method further comprises controlling, based on the threshold number, the number of I/O operations initiated to the disk array group.

21 Claims, 8 Drawing Sheets

(56) References Cited

U.S. PATENT DOCUMENTS

| | | | |
|---|---|---|---|
| 8,839,028 B1* | 9/2014 | Polia | G06F 11/1084 |
| | | | 714/6.24 |
| 9,747,222 B1 | 8/2017 | Armangau et al. | |
| 10,013,321 B1* | 7/2018 | Stern | G06F 11/1076 |
| 2015/0143167 A1* | 5/2015 | Maeda | G06F 11/2094 |
| | | | 714/6.22 |
| 2016/0162360 A1* | 6/2016 | Murakami | G06F 11/2082 |
| | | | 714/6.23 |

\* cited by examiner

METHODS, DEVICES AND COMPUTER READABLE MEDIUMS FOR MANAGING STORAGE SYSTEM

RELATED APPLICATIONS

This application claim priority from Chinese Patent Application Number CN201710250538.1, filed on Apr. 17, 2017 at the State Intellectual Property Office, China, titled "METHOD, APPARATUS AND COMPUTER-READABLE MEDIUM FOR MANAGING A STORAGE SYSTEM" the contents of which is herein incorporated by reference in its entirety.

FIELD

Embodiments of the present disclosure generally relate to the field of data storage, and more specifically, to methods, devices and computer readable mediums for managing a storage system.

BACKGROUND

A storage system usually has a variety of storage components to provide responses with different response time for input/output (I/O) requests from an upper layer application. For example, a storage system usually has a cache and a plurality of storage disks which can be organized into a disk array. The cache can be used to cache data in a dynamic random access memory (DRAM), for example, so as to provide a faster response for an I/O request. In comparison, the disk array can be used to respond to an I/O request for data not cached in the cache and such response typically has relatively long response time.

When a disk in the disk array fails, a spare disk in the disk array group that the failed disk belongs to is usually required to rebuild the failed disk (namely, restore data in the failed disk into the spare disk). During this rebuilding process, it is still possible for this storage system to receive a random I/O request for the failed disk array group from the upper layer application. A large amount of such random I/O requests may cause the rebuilding process to slow down, or even break off. In this case, if a failure occurs in another disk in the disk array group, data loss might happen.

SUMMARY

Embodiments of the present disclosure provide methods, devices and computer readable mediums for managing a storage system.

In a first aspect of the present disclosure, there is provided a method for managing a storage system which includes a disk array, the disk array including at least one disk array group. The method comprises: in response to receiving a first message indicating that a failure occurs in a disk in the disk array, determining first information on a disk array group that the failed disk belongs to; obtaining a first number of outstanding input/output (I/O) operations on rebuilding the failed disk in the disk array group; determining, based on the first information and the first number, a threshold number of I/O operations that is applicable for the disk array group; and controlling, based on the threshold number, the number of I/O operations initiated to the disk array group.

In a second aspect of the present disclosure, there is provided a method for managing a storage system which includes a disk array and a cache, the disk array at least including first and second disk array groups. The method comprises: in response to receiving a message indicating that a failure occurs in the first disk array group, selecting, from a plurality of lists in the cache, a first data entry to be written into the disk array, the plurality of lists at least including first and second lists, wherein the first list is used to cache a data entry for the failed disk array group in the disk array; in response to determining that the first data entry comes from the first list, writing the first data entry into the disk array; in response to determining that the first data entry comes from the second list and the first data entry is to be written into the first disk array group, moving the first data entry from the second list to the first list; and in response to determining that the first data entry is to be written into the second disk array group, writing the first data entry into the second disk array group.

In a third aspect of the present disclosure, there is provided a device for managing a storage system which includes a disk array, the disk array including at least one disk array group. The device comprises at least one processing unit and at least one memory. The at least one memory is coupled to the at least one processing unit and stores instructions for execution by the at least one processing unit, the instructions, when executed by the at least one processing unit, causing the device to perform acts, the acts comprising: in response to receiving a first message indicating that a failure occurs in a disk in the disk array, determining first information on a disk array group that the failed disk belongs to; obtaining a first number of outstanding input/output (I/O) operations on rebuilding the failed disk in the disk array group; determining, based on the first information and the first number, a threshold number of I/O operations that is applicable for the disk array group; and controlling, based on the threshold number, the number of I/O operations initiated to the disk array group.

In a fourth aspect of the present disclosure, there is provided a device for managing a storage system which includes a disk array and a cache, the disk array at least including first and second disk array groups. The device comprises at least one processing unit and at least one memory. The memory is coupled to the at least one processing unit and stores instructions for execution by the at least one processing unit, the instructions, when executed by the at least one processing unit, causing the device to perform acts, the acts comprising: in response to receiving a message indicating that a failure occurs in the first disk array group, selecting, from a plurality of lists in the cache, a first data entry to be written into the disk array, the plurality of lists at least including first and second lists, wherein the first list is used to cache a data entry for the failed disk array group in the disk array; in response to determining that the first data entry comes from the first list, writing the first data entry into the disk array; in response to determining that the first data entry comes from the second list and the first data entry is to be written into the first disk array group, moving the first data entry from the second list to the first list; and in response to determining that the first data entry is to be written into the second disk array group, writing the first data entry into the second disk array group.

In a fifth aspect of the present disclosure, there is provided a computer readable storage medium having computer readable program instructions stored thereon, the computer readable program instructions, when executed by a processing unit, causing the processing unit to implement the method according to the first aspect of the present disclosure.

In a sixth aspect of the present disclosure, there is provided a computer readable storage medium having computer readable program instructions stored thereon, the computer readable program instructions, when executed by a processing unit, causing the processing unit to implement the method according to the second aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of example embodiments of the present disclosure will become more apparent. In the example embodiments of present disclosure, the same reference signs usually represent the same components.

Throughout the drawings, the same or corresponding reference symbols are used to indicate the same or corresponding parts.

DETAILED DESCRIPTION OF EMBODIMENTS

Figure 1:
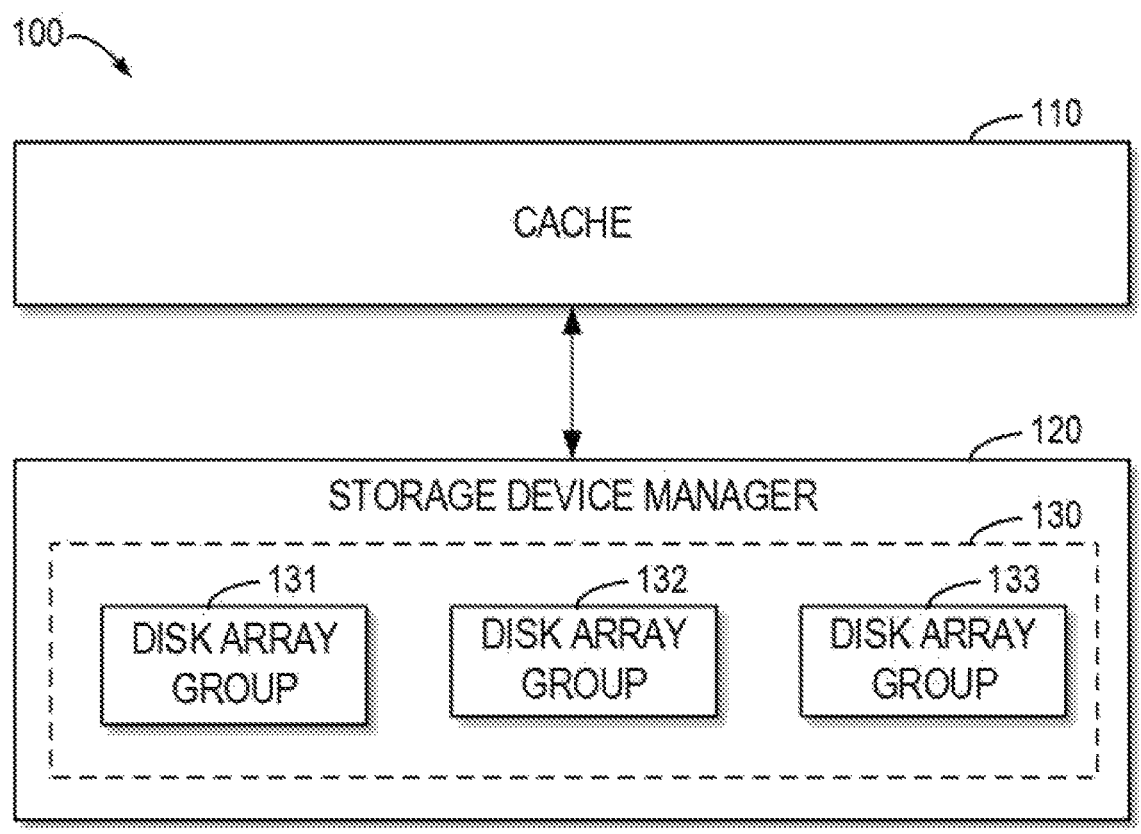
FIG. 1 illustrates an architecture diagram of a storage system 100 according to the embodiments of the present disclosure.

Preferred embodiments of the present disclosure will be described in the following text in greater detail with reference to the drawings. Although preferred embodiments of present disclosure are displayed in the drawings, it is to be understood that the present disclosure can be implemented in various manners, not limited to the embodiments illustrated herein. On the contrary, these embodiments are provided to make the subject matter described herein more thorough and more complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as "at least one other embodiment." Terms "a first", "a second" and others can denote different or identical objects. The following text may also contain other explicit or implicit definitions.

FIG. 1 illustrates an architecture diagram of a storage system 100 according to the embodiments of the present disclosure. As shown in FIG. 1, the storage system 100 may include a cache 110 and a storage device manager 120 for managing one or more storage devices. It is to be understood that the structure and functions of the storage system 100 as shown in FIG. 1 are only for purpose of illustration, without suggesting any limitations to the scope of the present disclosure. Embodiments of the present disclosure can be embodied in different structures and/or functions.

The cache 110 can be used to temporarily store data that is accessed frequently in a storage medium, such as a dynamic random access memory (DRAM), so as to respond to an I/O request for these data more quickly (for example, the response time may be about 60 microseconds). In some embodiments, the cache 110 can cache data in one or more cache pages and these cache pages can be organized into one or more lists.

The storage device manager 120 can be used to manage one or more storage devices (not shown in FIG. 1). As used herein, a "storage device" may refer to any non-volatile storage medium currently known or to be developed in the future, such as a magnetic disk, an optical disk, or a solid state disk, and so on. In the following depiction, the magnetic disk is used as an example for the storage device. However, it should be appreciated that this is only for the ease of depiction, without suggesting any limitations to the scope of the present disclosure.

As shown in FIG. 1, the storage device manager 120 can, for example, organize one or more disks into a disk array 130 and the disk array can be divided into one or more disk array groups (for example, disk array groups 131, 132 and 133). The storage device manager 120 can provide to the upper layer (such as a cache 110) logic storage units (such as, logic unit numbers, LUNs) corresponding to these disk array groups for operation. For the purpose of example, only three disk array groups are shown in FIG. 1. However, it is to be understood that embodiments of the present disclosure can be embodied in different number of disk array groups.

The disk array 130, for example, can be a Redundant Array of Independent Disks (RAID) which is a data storage virtualization technique for combining a plurality of physical magnetic disks into a logic storage unit for the purpose of data redundancy backup and/or performance improvement. According to the required degree of redundancy and level of performance, RAID may have different levels, such as RAID 0, RAID 1 . . . RAID 5 and so on.

When the storage system 100 receives an I/O request from an upper layer application, the I/O request can be firstly sent to the cache 110 so as to determine if the requested data have been cached in the cache 110. When the requested data has already been cached (also called "cache hit"), the storage system 100 can obtain the requested data from the cache 110 to respond to the I/O request. When the requested data is not cached (also called "cache not hit"), the I/O request can be sent to the disk array 130 via the cache 110 to obtain the requested data from the disk array 130.

Besides, to ensure data consistency, data cached in the cache 110 can be written into the disk array 130 at a proper time (for example, when the amount of data in the cache 110 exceeds a predefined threshold). In the following depiction, data which is cached in the cache 110 but has not yet been submitted to the disk array 130 is also called "dirty data."

When a disk in the disk array group (such as the disk array group 131) fails, the storage device manager 120 can send a first message to the cache 110 to notify the cache 110 of the failure of the disk in the disk array group 131. In response to receiving the first message, the cache 110 can identify LUNs associated with the disk array group 131 and configure the state of these LUNs as degraded. Meanwhile, the storage device manager 120 can start to utilize a spare disk in the disk array group 131 to rebuild the failed disk. After this rebuilding process is completed, the storage device manager 120 can may a second message to the cache 110 to notify the cache 110 of the recovery of the failure in the disk array group 131. In response to receiving the second message, the cache 110 can restore the state of the associated LUNs as normal.

The rebuilding process of the disk array group 131, for example, may include utilizing data stored on non-failed disks in the disk array group 131 to calculate data stored on the failed disk, and write the calculated data into the spare disk. Therefore, the rebuilding process may result in an amount of I/O operations (hereinafter referred to as "internal I/O operations"). Besides, during the rebuilding process, the storage system 100 may still receive a random I/O request for the disk array group 131 from the upper layer application (for instance, when the cache 110 is not hit). A large amount of such random I/O requests would probably cause the rebuilding process of the disk array group 131 to slow down or even break off. At this time, if another disk in the disk array group 131 also fails, data loss might happen. Hence, it is vital to reduce the time spent for the rebuilding process to diminish the risk of data loss.

In order to at least partially solve the above problem and one or more of other potential problems, example embodiments of the present disclosure provide a scheme for managing a storage system. By reducing the number of I/O operations on the failed disk array group and/or by caching more data for the failed disk array group to improve the cache hit rate, the scheme can accelerate the rebuilding process of the disk array group so as to reduce the risk of data loss. Besides, when the disk array is implemented with a plurality of SSDs, the present scheme can balance wearing degrees of the plurality of SSDs, thereby extending the life span of the plurality of SSDs.

Figure 2:
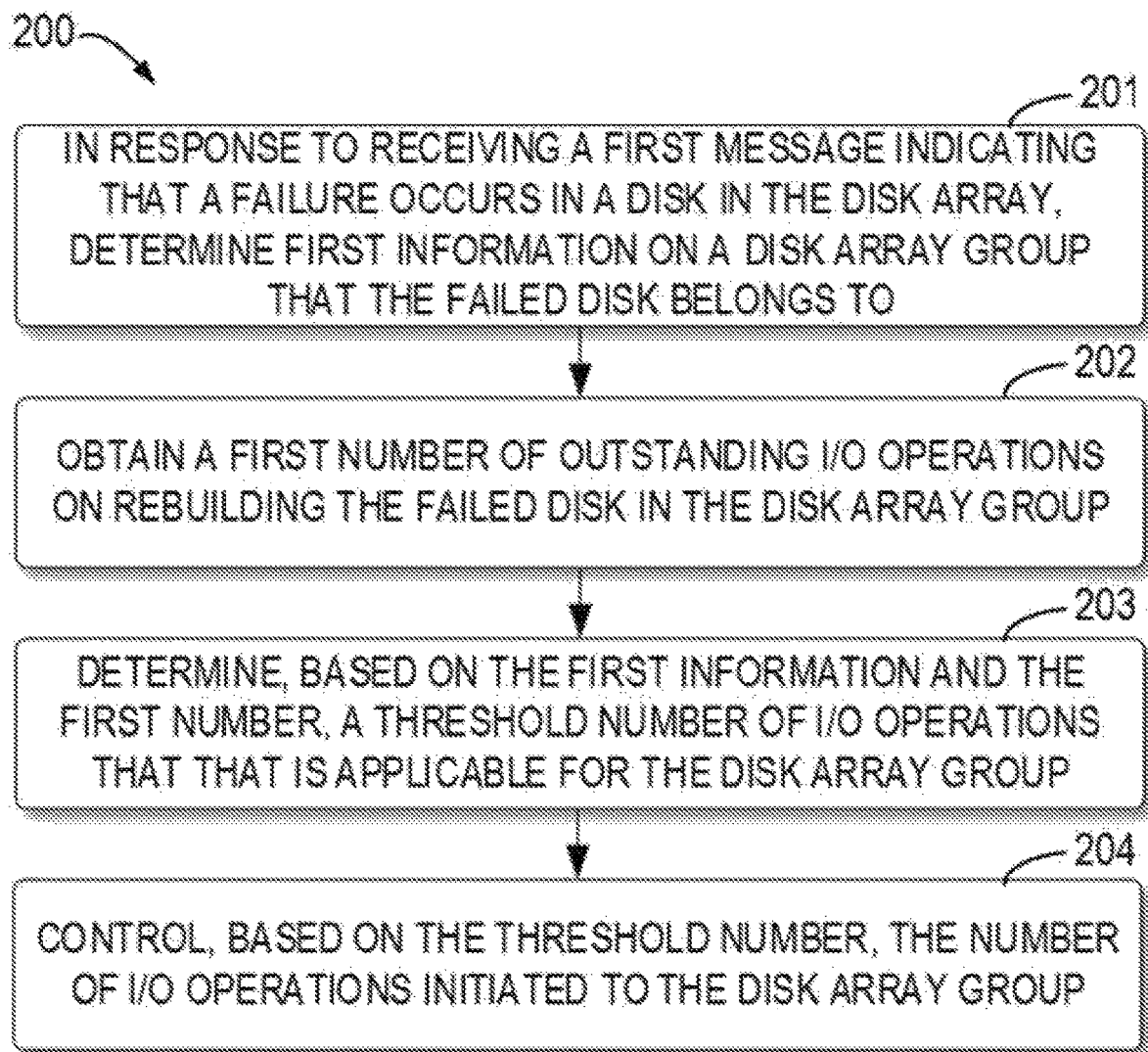
FIG. 2 illustrates a flowchart of a method 200 for managing a storage system according to the embodiments of the present disclosure.

FIG. 2 illustrates a flowchart of a method 200 for managing a storage system according to the embodiments of the present disclosure. Acts involved in the method 200 will be described below with reference to the storage system 100 as shown in FIG. 1. In some embodiments, the method 200 can be executed by the cache 110, for example. It is to be understood that method 200 may further include additional acts not shown and/or omit some shown acts. The scope of the present disclosure is not limited in this regards.

At block 201, in response to receiving a first message indicating that a failure occurs in a disk in the disk array 130, the cache 110 determines first information on the disk array group that the failed magnetic disk belongs to. In the following depiction, it is assumed that the failed disk belongs to the disk array group 131. It is to be understood that this is only for the ease of depiction, without suggesting any limitations to the scope of the present disclosure.

In some embodiments, the cache 110 can receive from the storage device manager 120 the first message indicating that the disk in the disk array group 131 fails. In response to receiving the first message, the cache 110 can identify a logic storage unit (such as, LUN) corresponding to the disk array group 131 and configure the state of the identified logic storage unit as degraded. In this manner, when the cache 110 determines that the data requested by the I/O request from the upper layer application is not cached, the cache 110 can further determine if the I/O request is for the failed disk array group 131, so as to implement the corresponding control.

In some embodiments, the cache 110 can further obtain at least the following information from the storage device manager 120 (for example, via the first message, or a message other than the first message): a total number of disks in the disk array group 131, the number of spare disks for rebuilding the failed disk, and the number of I/O operations affordable for each disk in the disk array group 131 (this number can be used interchangeably with "a second number" in the following depiction). Alternatively, in some embodiments, the number of spare disks for rebuilding the failed disk in the disk array group 131 can also be determined based on the type of disk array 130. For example, if the disk array 130 is RAID5, the number of spare disks in the disk array group 131 can be 1. If the disk array 130 is RAID6, the number of spare disks in the disk array group 131 can be 2.

At block 202, the cache 110 obtains the number of outstanding I/O operations of the disk array group 131 for rebuilding the failed disk (this number can be used interchangeably with "a first number" in the following depiction). In some embodiments, as stated above, the rebuilding process of the disk array group 131 may include utilizing data stored on non-failed disks in the disk array group 131 to calculate data stored on the failed disk, and write the calculated data into the spare disk. Therefore, the cache 110 can obtain from the storage device manager 120 (for example, via the first message, or a message other than the first message) a first number of internal I/O operations caused by the rebuilding process.

At block 203, the cache 110 determines, based on the first information on the disk array group 131 and the first number of the internal I/O operations on the rebuilding process, a threshold number I/O operations that is applicable for the disk array group 131.

In some embodiments, the cache 110 can determine, based on the total number of magnetic disks in the disk array group 131, the number of spare disks in the disk array group 131, the second number of I/O operations affordable for each magnetic disk in the disk array group 131 and the first number of internal I/O operations, the threshold number of I/O operations that is applicable for the disk array group 131. For example, it is assumed that the total number of magnetic disks in the disk array group 131 is n, the number of spare disks for rebuilding the failed disk in the disk array group 131 is t, the second number of I/O operations affordable for each magnetic disk in the disk array group 131 is k, and the first number of internal I/O operations is m, then the threshold number c of I/O operations that is applicable for the disk array group 131 can be determined as: $c = k*(n-t) - m$.

At block 204, the cache 110 controls, based on the threshold number, the number of I/O operations initiated to the disk array group 131. As stated above, in some embodiments, when the cache 110 determines that the data requested by the I/O request from the upper layer application is not cached, the cache 110 can further determine if the I/O request is for the failed disk array group 131. When the cache 110 determines that the I/O request is for the failed disk array group 131, it can control I/O operations initiated to the disk array group 131 based on the threshold number determined at block 203.

Figure 3:
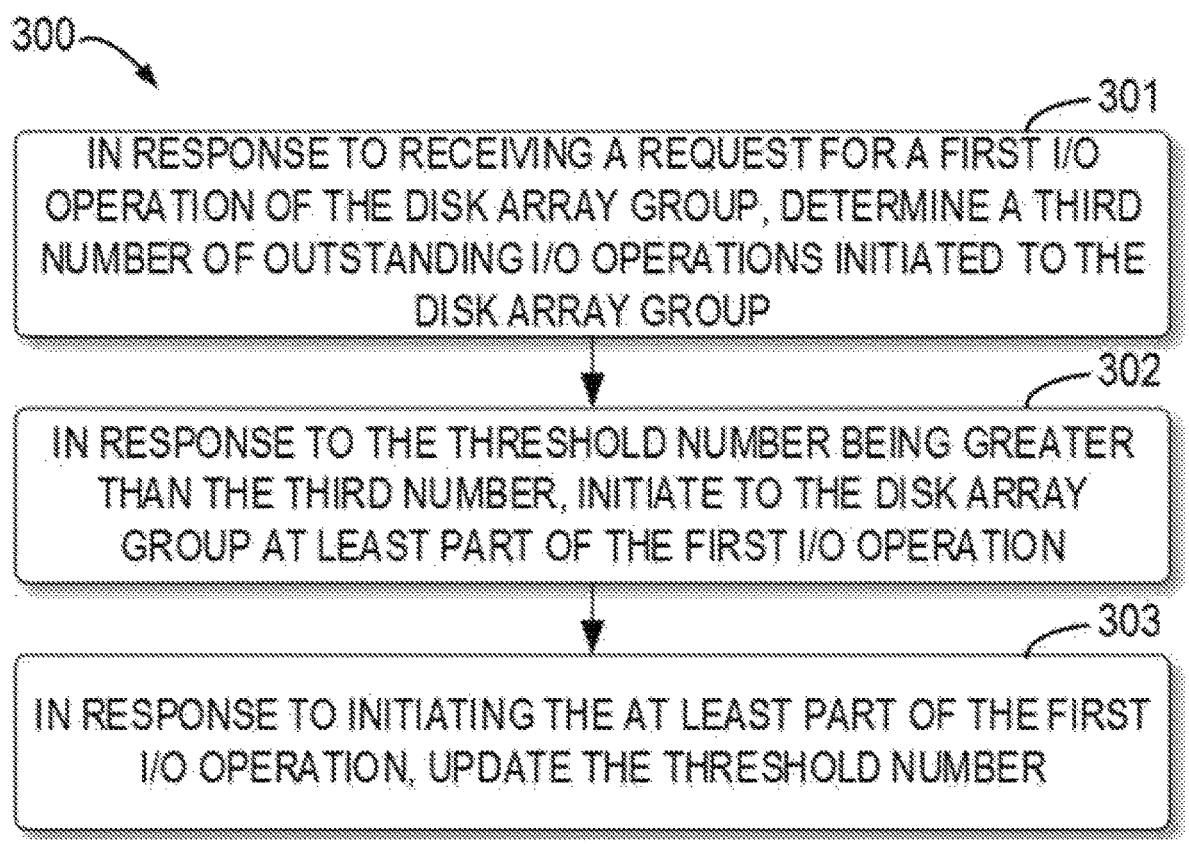
FIG. 3 illustrates a flowchart of a method 300 for controlling the number of I/O operations initiated to the disk array group according to the embodiments of the present disclosure.

In this aspect, FIG. 3 illustrates a flowchart of a method 300 for controlling the number of I/O operations initiated to the disk array group according to the embodiments of the present disclosure. In some embodiments, the method 300 can be implemented as an example of block 204 in method 200 as shown in FIG. 2. For example, the method 300 may be implemented by the cache 110 as shown in FIG. 1. It is to be understood that method 300 may include additional acts not shown and/or omit some shown acts and the scope of the present disclosure is not limited in this regards.

At block 301, in response to receiving a request for a first I/O operation on the disk array group 131, the cache 110 determines the number of outstanding I/O operations initiated to the disk array group 131 (this number can be used interchangeably with "the third number" in the following text).

At block 302, in response to the threshold number (for instance, which is determined at block 203 shown in FIG. 2) exceeding than the third number, the cache 110 initiates (such as, via the storage device manager 120) to the disk array group 131 at least part of first I/O operations.

In some embodiments, for example, it is assumed that the threshold number c for the disk array group 131 is 100, the third number s of outstanding I/O operations initiated to the disk array group 131 by the cache 110 is 50, and the number of the received I/O operations on the disk array group 131 is 60, then the cache 110 can only initiate 50 I/O operations out of the 60 I/O operations to the disk array group 131 (namely, 100−50=50). It is possible for the cache 110 not to initiate the other 10 I/O operations out of the 60 I/O operations until an I/O operation that has been initiated to the disk array group 131 is completed. In this manner, embodiments of the present disclosure can accelerate the rebuilding process by slowing down the initiation of I/O operations to the disk array group being rebuilt.

At block 303, in response to initiating at least part of the first I/O operations, the cache 110 updates the threshold number. In some embodiments, the initiated at least part of the first I/O operations may include a reading operation and the threshold number c can be reduced by a first predefined number accordingly. For example, the first predefined number can be 1. In some embodiments, the initiated at least part of the first I/O operations may include a writing operation and the threshold number c can be reduced by a second predefined number accordingly. In some embodiments, the second predefined number can be equal to the first predefined number. For example, the second predefined number can also be 1. Alternatively, in some embodiments, the second predefined number can be different from the first predefined number.

In some embodiments, when one writing operation is initiated to the disk array group 131 which is being rebuilt, the number (namely, the second predefined number) of I/O operations that actually happen may be greater than 1. For example, in order to ensure data consistency of the degraded disk array group 131 (because at this time there may be no disk for data redundancy in the disk array group 131 to verify if the written data is correct), if the writing operation on the disk array group 131 occurs, the storage device manager 120 may need an independent space to be used as a journal. For example, the storage device manager 120 can firstly write data into the journal and then write the data into its logic block address. Then, the storage device manager 120 can verify if the written data is correct and then remove the corresponding data in the journal space. In this case, the actual number (namely, the second predefined number) of I/O operations caused by the writing operation on the degraded disk array group 131 is 3, and the threshold number c should be reduced by 3 for the writing operation.

In some embodiments, according to the specific implementation, the first predefined number and/or the second predefined number can also be determined as other numbers different from those as shown in the above examples. Besides, the method 300 can be implemented more than once until the cache 110 initiates all of the I/O operations on the disk array group 131.

Returning to FIG. 2, the method 200 may also include acts not shown. For example, in some embodiments, when the rebuilding process of the disk array group 131 is completed, the cache 110 can receive a second message from the storage device manager 120, indicating to the cache 110 recovery of the failure in the disk array group 131. In response to receiving the second message, the cache 110 can restore the state of the associated LUN to normal.

As can be seen from the above depiction, embodiments of the present disclosure can accelerate the rebuilding process of the disk array group by reducing the number of I/O operations on the failed disk array group so as to reduce the risk of data loss. Moreover, when the disk array is implemented with a plurality of SSDs, the present scheme can balance wearing degrees of the plurality of SSDs, thereby extending the life span of the plurality of SSDs.

Additionally or alternatively, embodiments of the present disclosure can cache more data for the failed disk array group to further accelerate the rebuilding process of the disk array group and reduce the risk of data loss. In some embodiments, to ensure data consistency, dirty data cached in the cache 110 can be swapped in the disk array 130 at a proper time (for example, when the amount of data in the cache 110 exceeds a predefined threshold). In this case, the cache 110 can cache the dirty data for the failed disk array group 131 as long as possible so as to improve the cache hit rate, thereby accelerating the rebuilding process of the disk array group 131.

Figure 4:
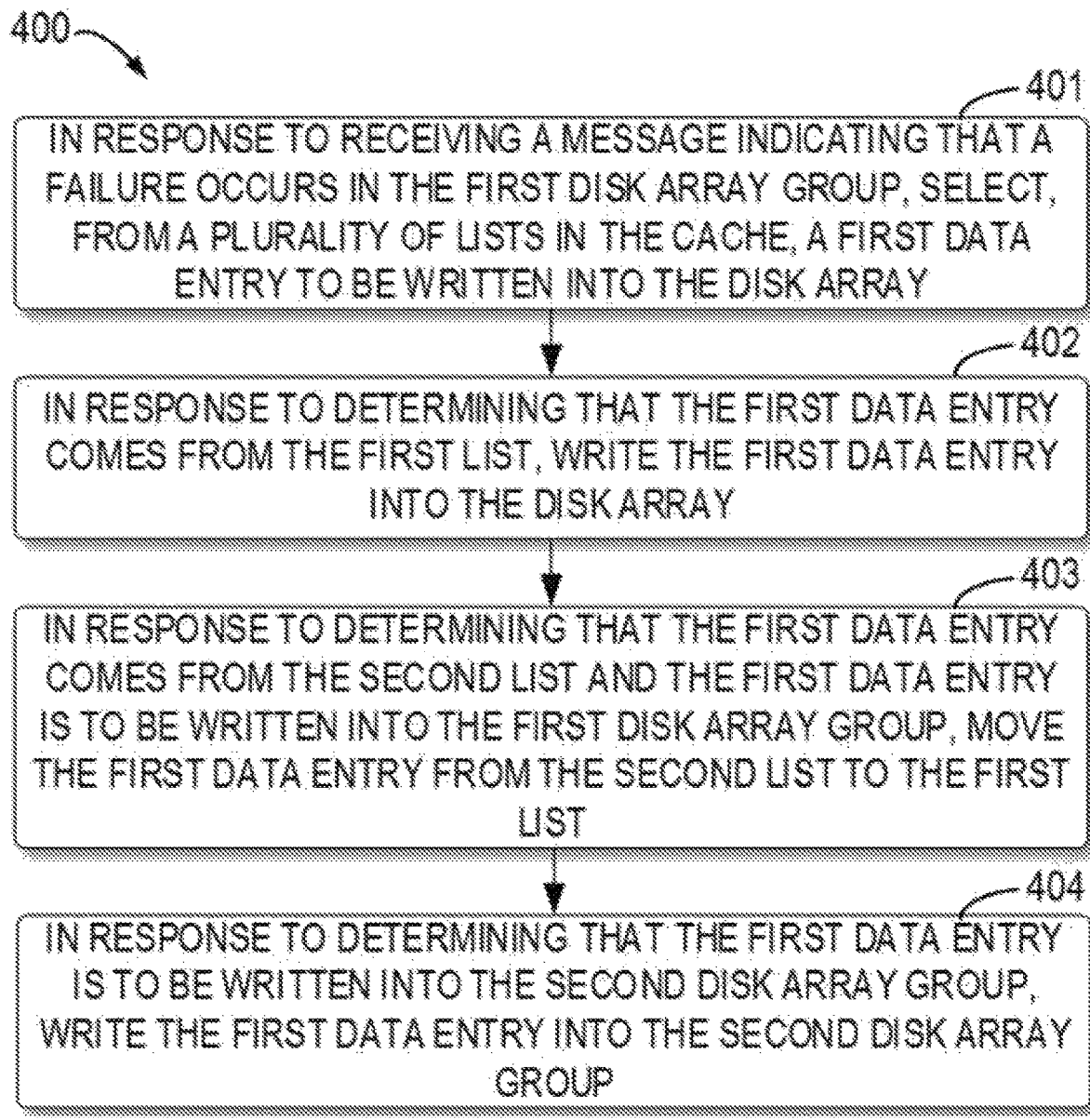
FIG. 4 illustrates a flowchart of a method 400 for managing a storage system according to the embodiments of the present disclosure.

FIG. 4 illustrates a flowchart of a method 400 for managing a storage system according to the embodiments of the present disclosure. The acts involved in the method 400 will be described below with reference to the storage system 100 shown in FIG. 1. In some embodiments, the method 400 can be implemented by the cache 110. It is to be understood that the method 400 may include additional acts not shown and/or omit some shown acts, and the scope of the present disclosure is not limited in this respect.

At block 401, in response to receiving a message indicating that a failure occurs in the disk array group 131 (also called "a first disk array group") in the disk array 130, the cache 110 selects from a plurality of lists in the cache 110 a first data entry to be written into the disk array 130. As used herein, a "data entry" refers to a storage unit of data cached in the cache 110. For example, in virtual paging storage, data swapping between the cache and the disk is performed in pages. In this case, "the first data entry" to be selected may refer to a corresponding cache page.

Figure 5:
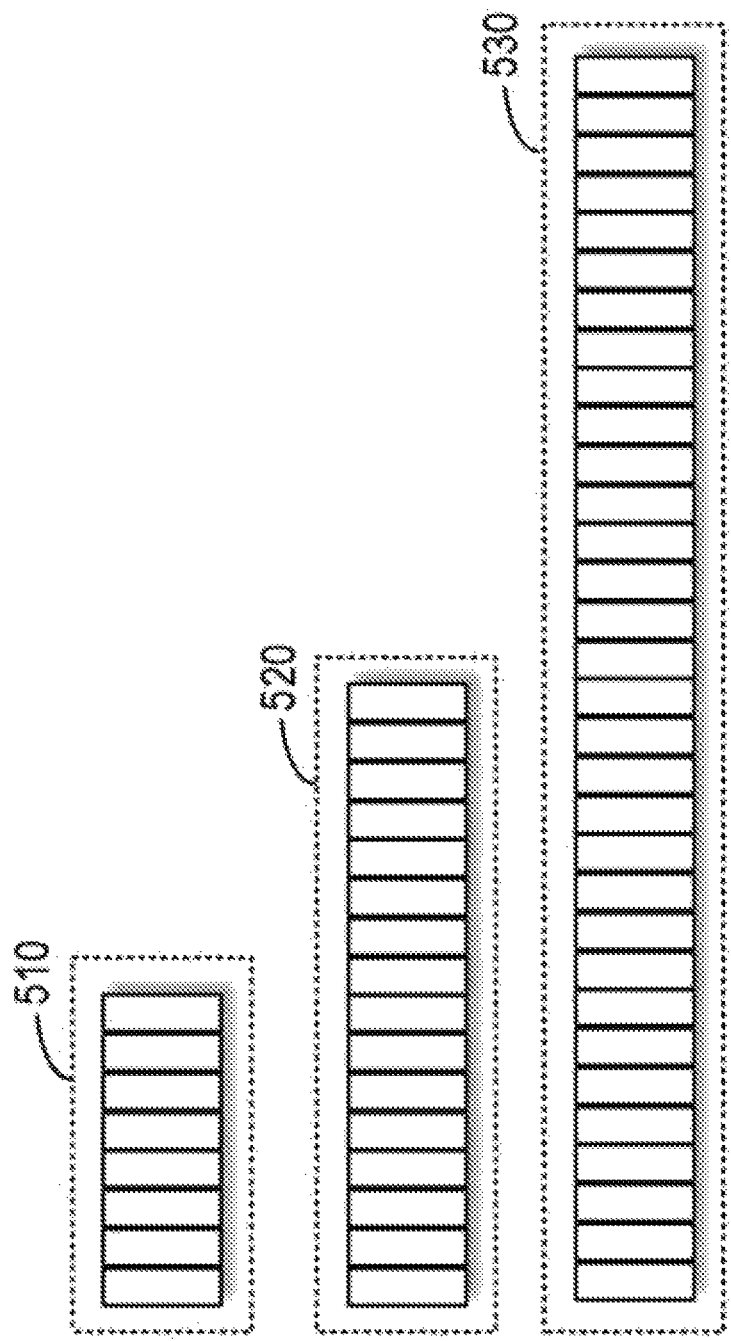
FIG. 5 illustrates a schematic diagram of a plurality of lists for organizing cache pages in a cache according to the embodiments of the present disclosure.

In some embodiments, as stated above, the cache 110 can cache data in one or more cache pages, and organize these cache pages in a plurality of lists. For example, FIG. 5 illustrates a schematic diagram of a plurality of lists in a cache for organizing cache pages according to the embodiments of the present disclosure. As shown in FIG. 5, the plurality of lists may include lists 510, 520 and 530, where the list 510 (hereinafter also called a "first list"), for instance, can be used to cache data entries of the failed disk array group in the disk array 130 while the lists 520 and 530 each are a normal list (hereinafter also called a "second list"). For the purpose of illustration, only three lists are shown in FIG. 5. However, it is to be understood that embodiments of the present disclosure can be embodied in different number of lists. The following acts involved in the method 400 will be depicted below with reference to FIG. 5.

In some embodiments, in order to select the first data entry, the cache 110 can firstly generate a set of candidate data entries from the lists 510, 520 and 530. For example, the cache 110 can select a data entry cached for a maximum period of time in one of the lists 510, 520 and 530 into the set of candidate data entries. In some embodiments, the lists 510, 520 and 530 each can be implemented as a least recently used (LRU) list. In this case, the cache 110 can select a respective data entry at the end of each of the lists 510, 520 and 530 into the set of candidate data entries.

Then, in some embodiments, the cache 110 can select the first data entry from the generated set of candidate date entries. In some embodiments, the lists 510, 520 and 530 can have respective weights, and the cache 110 can select the first data entry from the set of candidate data entries based on the respective weights.

For example, the weights of lists 510, 520 and 530 can be $w_1$, $w_2$ and $w_3$, respectively. In some embodiments, the list 510 of caching data entries for the failed disk in the disk array 130 may have the highest weight. For example, the weights of lists 510, 520 and 530 can have the following relationship: $w_1 > w_2 > w_3$ It is assumed that the set of candidate data entries include a data entry $i_1$ from the list 510, a data entry $i_2$ from the list 520 and a data entry $i_3$ from the list 530. Besides, it is assumed that the data entry $i_1$ has been cached in the list 510 for a first period of time $t_1$. The first period of time $t_1$, for example, can be obtained from the current time subtracted by the last time the data entry $i_1$ is accessed. Similarly, it is assumed that the data entry $i_2$ has been cached in the list 520 for a second period of time $t_2$, and the data entry $i_3$ has been cached in the list 530 for a third period of time $t_3$. The cache 110 can firstly determine a ratio $r_1$ of the first period of time $t_1$ with the weight of list 510 $w_1$ (namely, $r_1 = t_1/w_1$), a ratio $r_2$ of the second time $t_2$ to the weight of the list 520 $w_2$ (namely, $r_2 = t_2/w_2$) and a ratio $r_3$ of the third time $t_3$ to the weight of the list 530 $w_3$ (namely, $r_3 = t_3/w_3$). The cache 110 can select the data entry associated with the largest ratio among the ratios $r_1$, $r_2$ and $r_3$ as the first data entry. In this way, as the list 510 has the largest weight, data entries therein are the least likely to be chosen to be swapped out of the cache 110. Therefore, the data for the failed disk array group can be cached in the cache 110 as long as possible.

At block 402, the cache 110 determines if the first data entry comes from the list 510. If the cache 110 determines that the first data is from the list 510, it may remove the first data entry from the list 510 and swap it into the disk array 130.

At block 403, if the cache 110 determines that the first data entry is not from the list 510 (namely, from the list 520 or 530), it can further determine if the first data entry is for the first disk array group 131 in the degraded state. If cache 110 determines that the first data entry is to be written into the first disk array group 131 in the degraded state, the cache 110 can remove the first data entry from the list 520 or 530 and add it to the list 510.

At block 404, if the cache 110 determines that the first data entry is to be written into a non-failed disk array group in the disk array 130 (for example, the disk array group 132 or 133, also called a "second disk array group"), the cache 110 may write the first data entry into the non-failed disk array group.

In this manner, embodiments of the present disclosure can cache dirty data for the failed disk array group as long as possible to improve the cache hit rate, thereby accelerating the rebuilding process of the failed disk array group. In addition, when the disk array is implemented with a plurality of SSDs, the present scheme can balance wearing degrees of the plurality of SSDs, thereby extending the life span of the plurality of SSDs.

Figure 6:
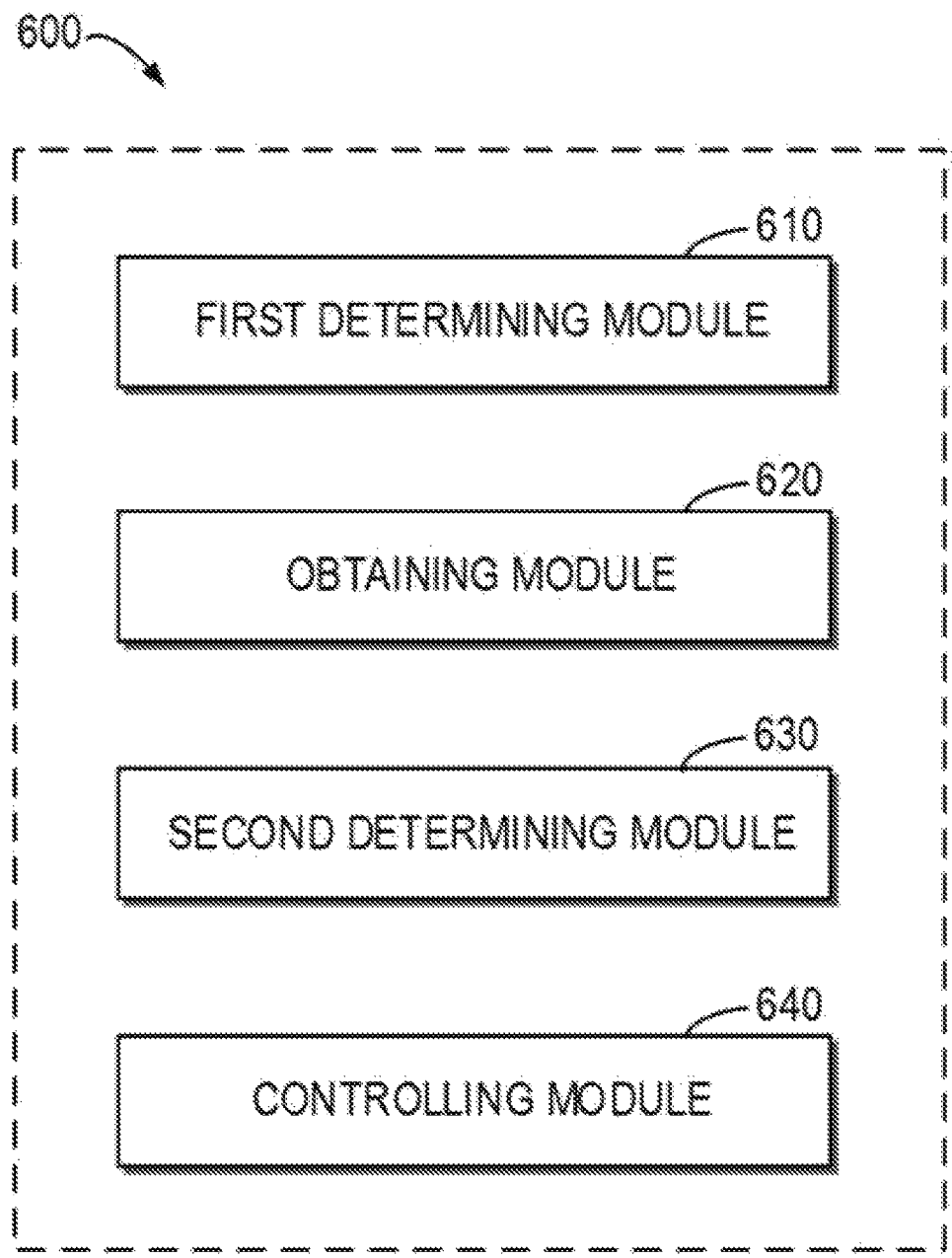
FIG. 6 illustrates a block diagram of an apparatus 600 for managing a storage system according to the embodiments of the present disclosure.

FIG. 6 illustrates a block diagram of an apparatus 600 for managing a storage system 100 according to the embodiments of the present disclosure. For example, the cache 110 as shown in FIG. 1 can be implemented by the apparatus 600. As shown in FIG. 6, the apparatus 600 may include a first determining module 610 configured to in response to receiving a first message indicating that a failure occurs in a disk in the disk array 130, determine first information on a disk array group that the failed disk belongs to (such as the disk array group 131). The apparatus 600 may further include an obtaining module 620 configured to obtain a first number of outstanding input/output (I/O) operations on rebuilding the failed disk in the disk array group. The apparatus 600 may further include a second determining module 630 configured to determine, based on the first information and the first number, a threshold number of I/O operations that is applicable for the disk array group. Furthermore, the apparatus 600 may further include a control module 640 configured to control, based on the threshold number, the number of I/O operations initiated to the disk array group.

Figure 7:
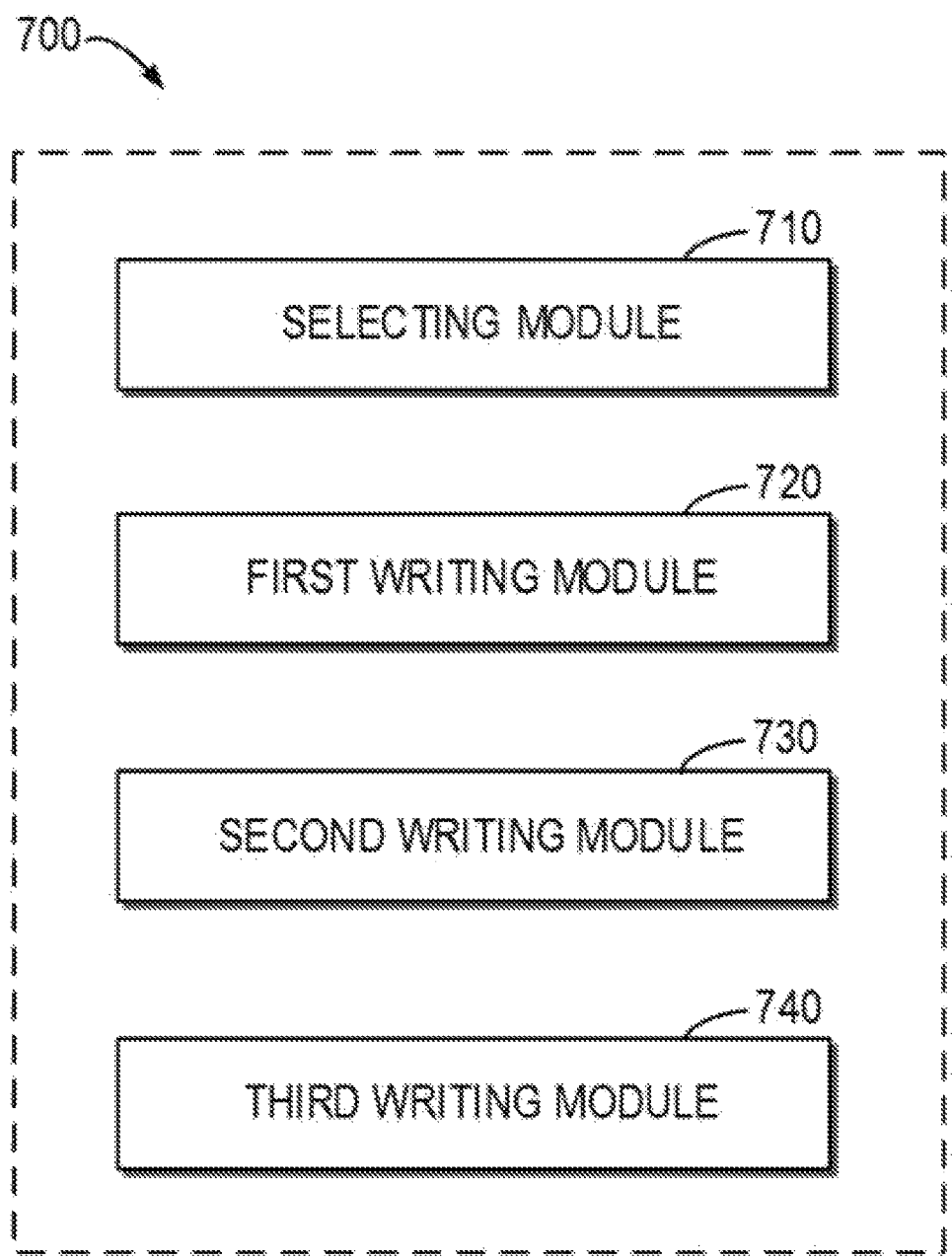
FIG. 7 illustrates a block diagram of an apparatus 700 for managing a storage system according to the embodiments of the present disclosure.

FIG. 7 illustrates a block diagram of an apparatus 700 for managing a storage system 100 according to the embodiments of the present disclosure. For example, the cache 110 as shown in FIG. 1 can be implemented by the apparatus 700. As shown in FIG. 7, the apparatus 700 may include a selecting module 710 configured, in response to receiving a message indicating that a failure occurs in the first disk array group (such as, the disk array group 131), select, from a plurality of lists in the cache, a first data entry to be written into the disk array 130, the plurality of lists at least including first and second lists, wherein the first list is used to cache a data entry for the failed disk array group in the disk array. The apparatus 700 may further include a first writing module 720 configured to, in response to determining that the first data entry comes from the first list, write the first data entry into the disk array 130. The apparatus 700 may further comprise a second writing module 730 configured to, in response to determining that the first data entry comes from the second list and the first data entry is to be written into the first disk array group, move the first data entry from the second list to the first list. Besides, the apparatus 700 may further include a third writing module 740 configured to, in response to determining that the first data entry is to be written into the second disk array group (such as, the disk array group 132 or 133), write the first data entry into the second disk array group.

For the sake of clarity, some optional modules of the apparatus 600 and/or 700 are not shown in FIGS. 6 and/or 7. However, it is to be understood that various features as described with reference to FIGS. 1-3 are likewise applicable to the apparatus 600, and various features as described above with reference to FIG. 1 and FIGS. 4-5 can also be applicable to the apparatus 700. Besides, respective modules in the apparatus 600 and/or 700 may be hardware modules or software modules. For example, in some embodiments, the apparatus 600 and/or 700 may be partially or completely implemented in software and/or firmware, e.g., implemented as a computer program product embodied on a computer readable medium. Alternatively or additionally, the apparatus 600 and/or 700 may be partially or completely implemented based on hardware, for example, implemented as an integrated circuit (IC) chip or an application specific integrated circuit (ASIC), a system on chip (SOC), a field programmable gate array (FPGA) and so on. The scope of the present invention is not limited in this aspect.

Figure 8:
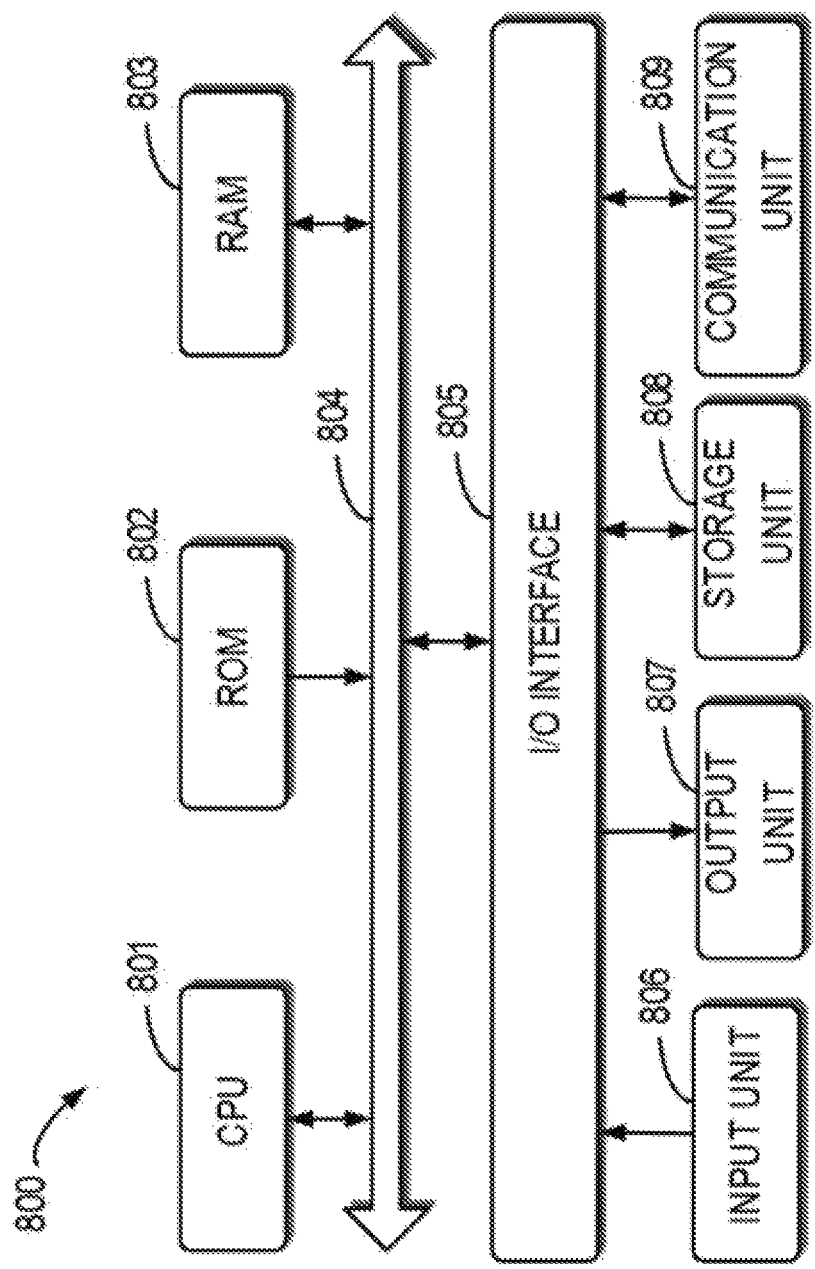
FIG. 8 illustrates a schematic diagram of an illustrative device 800 for implementing the embodiments of the present disclosure.

FIG. 8 illustrates a schematic diagram of an example device 800 for implementing the embodiments of the present disclosure. For example, the cache 110 as shown in FIG. 1 can be implemented by the device 800. As illustrated in the FIG. 8, the device 800 comprises a central processing unit (CPU) 801 which can execute various appropriate actions and processing based on the computer program instructions stored in a read-only memory (ROM) 802 or the computer program instructions loaded into a random access memory (RAM) 803 from a storage unit 808. The RAM 803 also stores all kinds of programs and data required by operating the storage device 800. CPU 801, ROM 802 and RAM 803 are connected to each other via a bus 804 to which an input/output (I/O) interface 805 is also connected.

A plurality of components in the apparatus 800 are connected to the I/O interface 805, comprising: an input unit 806, such as keyboard, mouse and the like; an output unit 807, such as various types of displays, loudspeakers and the like; a storage unit 808, such as magnetic disk, optical disk and the like; and a communication unit 809, such as network card, modem, wireless communication transceiver and the like. The communication unit 809 allows the apparatus 800 to exchange information/data with other devices through computer networks such as Internet and/or various telecommunication networks.

Each procedure and processing as described above, such as the method 200, 300 and/or 400, can be executed by the processing unit 801. For example, in some embodiments, the method 200, 300 and/or 400 can be implemented as computer software programs, which are tangibly included in a machine-readable medium, such as the storage unit 808. In some embodiments, the computer program can be partially or completely loaded and/or installed to the device 800 via the ROM 802 and/or the communication unit 809. When the computer program is loaded to the RAM 803 and executed by the CPU 801, one or more steps of the above described method 200, 300 and/or 400 are implemented.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for managing a storage system, the storage system including a disk array which includes at least one disk array group, the method comprising:
   in response to receiving a first message indicating that a failure occurs in a disk in the disk array, determining first information on a disk array group that the failed disk belongs to;
   obtaining a first number of outstanding input/output (I/O) operations on rebuilding the failed disk in the disk array group;
   determining, based on the first information and the first number, a threshold number of I/O operations that is applicable for the disk array group; and
   controlling, based on the threshold number, the number of I/O operations initiated to the disk array group;
   wherein controlling the number of I/O operations initiated to the disk array group comprises:
   in response to receiving a request for a first I/O operation on the disk array group, determining a third number of outstanding I/O operations initiated to the disk array group;
   in response to the threshold number exceeding the third number, initiating to the disk array group at least part of first I/O operations; and
   in response to initiating the at least part of the first I/O operations, updating the threshold number.

2. The method according to claim 1, wherein determining the first information on the disk array group that the failed disk comprises:
   identifying a logic storage unit corresponding to the disk array group; and
   setting a state of the identified logic storage unit from a normal state to a degraded state.

3. The method according to claim 2, further comprising:
   in response to receiving a second message indicating that the failure in the disk array group is removed, setting the state of the logic storage unit from the degraded state back to the normal state.

4. The method according to claim 1, wherein determining the first information on the disk array group comprises:
   obtaining:
      a total number of disks in the disk array group;
      the number of spare disks for rebuilding the failed disk in the disk array group; and
      a second number of I/O operations affordable for each disk in the disk array group.

5. The method according to claim 4, wherein determining the threshold number of I/O operations that is applicable for the disk array group comprises:
   determining the threshold number based on the total number of disks, the number of spare disks, the first number and the second number.

6. The method according to claim 1, wherein the at least part of the first I/O operations includes a reading operation, and wherein updating the threshold number comprises:
   in response to initiating the reading operation, reducing the threshold number by a first predefined number.

7. The method according to claim 1, wherein the at least part of the first I/O operations includes a writing operation, and wherein updating the threshold number comprises:
   in response to initiating the writing operation, reducing the threshold number by a second predefined number.

8. A system, comprising:
   a storage system including a disk array which includes at least one disk array group;
   computer-executable program logic encoded in memory of one or more computers enabled to manage storage, wherein the computer-executable program logic is configured for the execution of:
   in response to receiving a first message indicating that a failure occurs in a disk in the disk array, determining first information on a disk array group that the failed disk belongs to;
   obtaining a first number of outstanding input/output (I/O) operations on rebuilding the failed disk in the disk array group;
   determining, based on the first information and the first number, a threshold number of I/O operations that is applicable for the disk array group; and
   controlling, based on the threshold number, the number of I/O operations initiated to the disk array group;

wherein controlling the number of I/O operations initiated to the disk array croup comprises:

in response to receiving a request for a first I/O operation on the disk array group, determining a third number of outstanding I/O operations initiated to the disk array group;

in response to the threshold number exceeding the third number, initiating to the disk array group at least part of first I/O operations; and in response to initiating the at least part of the first I/O operations, updating the threshold number.

9. The system according to claim 8, wherein determining the first information on the disk array group that the failed disk comprises:

identifying a logic storage unit corresponding to the disk array group; and setting a state of the identified logic storage unit from a normal state to a degraded state.

10. The system according to claim 9, wherein the computer-executable program logic is further configured for the execution of:

in response to receiving a second message indicating that the failure in the disk array group is removed, setting the state of the logic storage unit from the degraded state back to the normal state.

11. The system method according to claim 8, wherein determining the first information on the disk array group comprises:

obtaining:
  a total number of disks in the disk array group;
  the number of spare disks for rebuilding the failed disk in the disk array group; and
  a second number of I/O operations affordable for each disk in the disk array group.

12. The system according to claim 11, wherein determining the threshold number of I/O operations that is applicable for the disk array group comprises:

determining the threshold number based on the total number of disks, the number of spare disks, the first number and the second number.

13. The system according to claim 8, wherein the at least part of the first I/O operations includes a reading operation, and wherein updating the threshold number comprises:

in response to initiating the reading operation, reducing the threshold number by a first predefined number.

14. The system according to claim 8, wherein the at least part of the first I/O operations includes a writing operation, and wherein updating the threshold number further comprises:

in response to initiating the writing operation, reducing the threshold number by a second predefined number.

15. A computer program product for managing a storage system, the storage system including a disk array which includes at least one disk array group, the computer program product comprising:

a non-transitory computer readable medium encoded with computer executable code, the code configured to enable the execution of:

in response to receiving a first message indicating that a failure occurs in a disk in the disk array, determining first information on a disk array group that the failed disk belongs to;

obtaining a first number of outstanding input/output (I/O) operations on rebuilding the failed disk in the disk array group;

determining, based on the first information and the first number, a threshold number of I/O operations that is applicable for the disk array group; and controlling, based on the threshold number, the number of I/O operations initiated to the disk array group;

wherein controlling the number of I/O operations initiated to the disk array group comprises:

in response to receiving a request for a first I/O operation on the disk array group, determining a third number of outstanding I/O operations initiated to the disk array group;

in response to the threshold number exceeding the third number, initiating to the disk array group at least part of first I/O operations; and in response to initiating the at least part of the first I/O operations, updating the threshold number.

16. The computer program product according to claim 15, wherein determining the first information on the disk array group that the failed disk comprises:

identifying a logic storage unit corresponding to the disk array group; and setting a state of the identified logic storage unit from a normal state to a degraded state.

17. The computer program product according to claim 16, wherein the code is further configured to enable the execution of:

in response to receiving a second message indicating that the failure in the disk array group is removed, resetting the state of the logic storage unit from the degraded state back to the normal state.

18. The computer program product according to claim 15, wherein determining the first information on the disk array group comprises:

obtaining:
  a total number of disks in the disk array group;
  the number of spare disks for rebuilding the failed disk in the disk array group; and
  a second number of I/O operations affordable for each disk in the disk array group.

19. The method according to claim 1, wherein a cache is constructed and arranged to initiate cached I/O operations to the disk array group; and wherein controlling the number of I/O operations further comprises:

while the disk array group is able to receive cached I/O operations from the cache, delaying initiation at least some of the cached I/O operations from the cache to accelerate rebuilding of the failed disk.

20. The system according to claim 8, wherein a cache is constructed and arranged to initiate cached I/O operations to the disk array group; and wherein controlling the number of I/O operations further comprises:

while the disk array group is able to receive cached I/O operations from the cache, delaying initiation at least some of the cached I/O operations from the cache to accelerate rebuilding of the failed disk.

21. The computer program product according to claim 15, wherein a cache is constructed and arranged to initiate cached I/O operations to the disk array group; and wherein controlling the number of I/O operations further comprises:

while the disk array group is able to receive cached I/O operations from the cache, delaying initiation at least some of the cached I/O operations from the cache to accelerate rebuilding of the failed disk.

\* \* \* \* \*